United States Patent
Li et al.

(10) Patent No.: US 10,798,372 B2
(45) Date of Patent: Oct. 6, 2020

(54) GATE LINE SCANNING METHODOLOGY FOR THREE-DIMENSIONAL DISPLAY DRIVING METHOD AND DEVICE, AND DISPLAY DEVICE

(71) Applicant: BOE TECHNOLOGY GROUP CO., LTD., Beijing (CN)

(72) Inventors: Quanhu Li, Beijing (CN); Yicheng Lin, Beijing (CN); Yu Wang, Beijing (CN); Yue Wu, Beijing (CN); Song Meng, Beijing (CN); Yongqian Li, Beijing (CN); Pan Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/097,815

(22) PCT Filed: Feb. 12, 2018

(86) PCT No.: PCT/CN2018/076519
§ 371 (c)(1),
(2) Date: Oct. 30, 2018

(87) PCT Pub. No.: WO2018/177043
PCT Pub. Date: Oct. 4, 2018

(65) Prior Publication Data
US 2019/0132583 A1 May 2, 2019

(30) Foreign Application Priority Data
Mar. 29, 2017 (CN) .......................... 2017 1 0196336

(51) Int. Cl.
*G09G 5/00* (2006.01)
*H04N 13/398* (2018.01)
(Continued)

(52) U.S. Cl.
CPC ......... *H04N 13/398* (2018.05); *G09G 3/3233* (2013.01); *G09G 3/3611* (2013.01);
(Continued)

(58) Field of Classification Search
CPC .... G09G 3/3611; G09G 3/3233; G09G 3/003; G09G 3/2007; H04N 13/302; H04N 13/315; H04N 13/341; H04N 13/398
See application file for complete search history.

(56) References Cited

U.S. PATENT DOCUMENTS 8,159,444 B2 *  4/2012  Go ....................... G09G 3/3677
                                                 345/100
2006/0176265 A1 *  8/2006  Kim ..................... G09G 3/3648
                                                 345/100
(Continued)

FOREIGN PATENT DOCUMENTS

CN      102413348 A     4/2012
CN      102457754       5/2012
(Continued)

OTHER PUBLICATIONS

First Chinese Office Action dated Mar. 2, 2018, received for corresponding Chinese Application No. 201710196336.3.
(Continued)

*Primary Examiner* — Adam J Snyder
(74) *Attorney, Agent, or Firm* — Kinney & Lange, P.A.

(57) ABSTRACT

A 3D display driving method, a 3D display driving device and a display device are provided. The 3D display driving method includes, during each display period: within a display duration $(2n-1)^{th}$ for a left-eye image of a left-eye image frame, scanning a first gate line in an $n^{th}$ group of gate lines, and within a part of the display duration $(2n-1)^{th}$ for the left-eye image, scanning a second gate line in the $n^{th}$ group of gate lines; and within a display duration $(2n)^{th}$ for
(Continued)

a right-eye image of a right-eye image frame, scanning the second gate line in the n$^{th}$ group of gate lines, n being a positive integer smaller than or equal to M, and M being an integer greater than 1.

15 Claims, 2 Drawing Sheets

(51) Int. Cl.
*H04N 13/302* (2018.01)
*G09G 3/36* (2006.01)
*G09G 3/3233* (2016.01)
*H04N 13/341* (2018.01)
*H04N 13/315* (2018.01)
*G09G 3/00* (2006.01)
*G09G 3/20* (2006.01)

(52) U.S. Cl.
CPC ........... *H04N 13/302* (2018.05); *G09G 3/003* (2013.01); *G09G 3/2007* (2013.01); *G09G 2310/0205* (2013.01); *G09G 2310/0218* (2013.01); *H04N 13/315* (2018.05); *H04N 13/341* (2018.05)

(56) References Cited

U.S. PATENT DOCUMENTS

| | | | | |
|---|---|---|---|---|
| 2007/0085797 A1* | 4/2007 | Kim | .................. | G02F 1/136286 345/93 |
| 2009/0021509 A1* | 1/2009 | Lee | ..................... | G09G 3/3677 345/213 |
| 2012/0113169 A1 | 5/2012 | Goo et al. | | |
| 2013/0113690 A1 | 5/2013 | Ishii et al. | | |
| 2013/0201181 A1 | 8/2013 | Lee et al. | | |
| 2013/0293593 A1 | 11/2013 | Lee et al. | | |
| 2014/0035894 A1* | 2/2014 | Hsiao | ..................... | G09G 3/003 345/208 |
| 2014/0160111 A1* | 6/2014 | Zhang | ................... | G09G 3/003 345/215 |
| 2014/0210869 A1 | 7/2014 | Mizushiro | | |
| 2014/0375621 A1 | 12/2014 | Lee et al. | | |
| 2016/0155405 A1* | 6/2016 | Kim | ....................... | G09G 3/003 345/213 |
| 2018/0217461 A1 | 8/2018 | Guo et al. | | |

FOREIGN PATENT DOCUMENTS

| | | | | |
|---|---|---|---|---|
| CN | 102799011 | A | 11/2012 | |
| CN | 102981339 | | 3/2013 | |
| CN | 103384336 | A | 11/2013 | |
| CN | 103971653 | A | 8/2014 | |
| CN | 104253987 | A | 12/2014 | |
| CN | 105047173 | A | 11/2015 | |
| CN | 105579943 | A | 5/2016 | |
| CN | 105654884 | A | 6/2016 | |
| CN | 105954949 | A | 9/2016 | |
| CN | 106851255 | a | 6/2017 | |
| KR | 20120122607 | A * | 11/2012 | ............... G09G 3/36 |

OTHER PUBLICATIONS

International Search Report dated May 17, 2018, received for corresponding PCT Application No. PCT/CN2018/076519.

* cited by examiner

GATE LINE SCANNING METHODOLOGY FOR THREE-DIMENSIONAL DISPLAY DRIVING METHOD AND DEVICE, AND DISPLAY DEVICE

CROSS-REFERENCE TO RELATED APPLICATION

The present application is the U.S. national phase of PCT Application No. PCT/CN2018/076519 filed on Feb. 12, 2018, which claims a priority of the Chinese patent application No. 201710196336.3 filed on Mar. 29, 2017, which are incorporated herein by reference in its entirety.

TECHNICAL FIELD

The present disclosure relates to the field of display driving technology, in particular to a three-dimensional (3D) display driving method, a 3D display driving device and a display device.

BACKGROUND

For a conventional shutter 3D display driving mode, a normal 60 Hz image is divided into two 120 Hz images for left and right eyes respectively. In order to refresh an entirety of the 120 Hz image within each frame in the 3D display mode, a charge time for each pixel may be reduced by half. In order to reduce the requirement on the charge time of a pixel in the 3D display mode, a Pseudo Gate Double Method (P_GDM) display mode has been proposed in the related art. In the P_GDM display mode, for odd-numbered frames and even-numbered frames, it is able to, through a gate signal, achieve full-resolution display where the charge time is doubled and data loss occurs for odd-numbered or even-numbered gate lines to some extent. However, when the corresponding gate line is scanned repeatedly, an actual display brightness value is greatly different from a written brightness value. Especially in the case that there is a very big difference between pieces of image information for adjacent rows, a boundary between the images may become blurry or image distortion may occur when the P-GDM display mode is adopted.

SUMMARY

A main object of the present disclosure is to provide a 3D display driving method, a 3D display driving device and a display device.

In one aspect, the present disclosure provides in some embodiments a 3D display driving method for driving a display panel to display an image in a 3D manner. The display panel includes a plurality of gate lines which is arranged in rows and divided into M groups, and M is an integer greater than 1. Each group of gate lines includes two adjacent gate lines, and the two adjacent gate lines include a first gate line and a second gate line. Each display period includes a left-eye image frame and a right-eye image frame. Each left-eye image frame includes 2M display durations for a left-eye image, and each right-eye image frame includes 2M display durations for a right-eye image. The 3D display driving method includes, during each display period: within a display duration $(2n-1)^{th}$ for the left-eye image of the left-eye image frame, scanning a first gate line in an $n^{th}$ group of gate lines, and within a part of the display duration $(2n-1)^{th}$ for the left-eye image, scanning a second gate line in the $n^{th}$ group of gate lines; and within a display duration $(2n)^{th}$ for the right-eye image of the right-eye image frame, scanning the second gate line in the $n^{th}$ group of gate lines, n being a positive integer smaller than or equal to M.

In a possible embodiment of the present disclosure, a ratio of the part of the display duration $(2n-1)^{th}$ for the left-eye image to an entirety of the display duration $(2n-1)^{th}$ for the left-eye image is greater than 0 and smaller than 1.

In a possible embodiment of the present disclosure, each display period includes the left-eye image frame and the right-eye image frame arranged sequentially; or each display period includes the right-eye image frame and the left-eye image frame arranged sequentially.

In a possible embodiment of the present disclosure, the first gate line is a gate line in a first row of the group of gate lines, and the second gate line is a gate line in a second row of the group of gate lines following the first gate line; or the second gate line is a gate line in a first row of the group of gate lines, and the first gate line is a gate line in a second row of the group of gate lines following the second gate line.

In a possible embodiment of the present disclosure, the ratio is determined in accordance with data voltages applied to the first gate line and the second gate line when an image is displayed by the display panel in a 3D manner.

In another aspect, the present disclosure provides in some embodiments a 3D display driving device for driving a display panel to display an image in a 3D manner. The display panel includes a plurality of gate lines which is arranged in rows and divided into M groups, and M is an integer greater than 1. Each group of gate lines includes two adjacent gate lines, and the two adjacent gate lines include a first gate line and a second gate line. The 3D display driving device includes: a frame division unit configured to divide each display period into a left-eye image frame and a right-eye image frame; and a display driving unit configured to, during each display period: within a display duration $(2n-1)^{th}$ for a left-eye image of the left-eye image frame, scan a first gate line in an $n^{th}$ group of gate lines, within a part of the display duration $(2n-1)^{th}$ for the left-eye image, scan a second gate line in the $n^{th}$ group of gate lines, and within a display duration $(2n)^{th}$ for a right-eye image of the right-eye image frame, scan the second gate line in the $n^{th}$ group of gate lines, n being a positive integer smaller than or equal to M.

In a possible embodiment of the present disclosure, a ratio of the part of the display duration $(2n-1)^{th}$ for the left-eye image to an entirety of the display duration $(2n-1)^{th}$ for the left-eye image is greater than 0 and smaller than 1.

In a possible embodiment of the present disclosure, each display period includes the left-eye image frame and the right-eye image frame arranged sequentially; or each display period includes the right-eye image frame and the left-eye image frame arranged sequentially.

In a possible embodiment of the present disclosure, the first gate line is a gate line in a first row of the group of gate lines, and the second gate line is a gate line in a second row of the group of gate lines following the first gate line; or the second gate line is a gate line in a first row of the group of gate lines, and the first gate line is a gate line in a second row of the group of gate lines following the second gate line.

In a possible embodiment of the present disclosure, the ratio is determined in accordance with data voltages applied to the first gate line and the second gate line when an image is displayed by the display panel in a 3D manner.

In yet another aspect, the present disclosure provides in some embodiments a display device including the above-mentioned 3D display driving device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
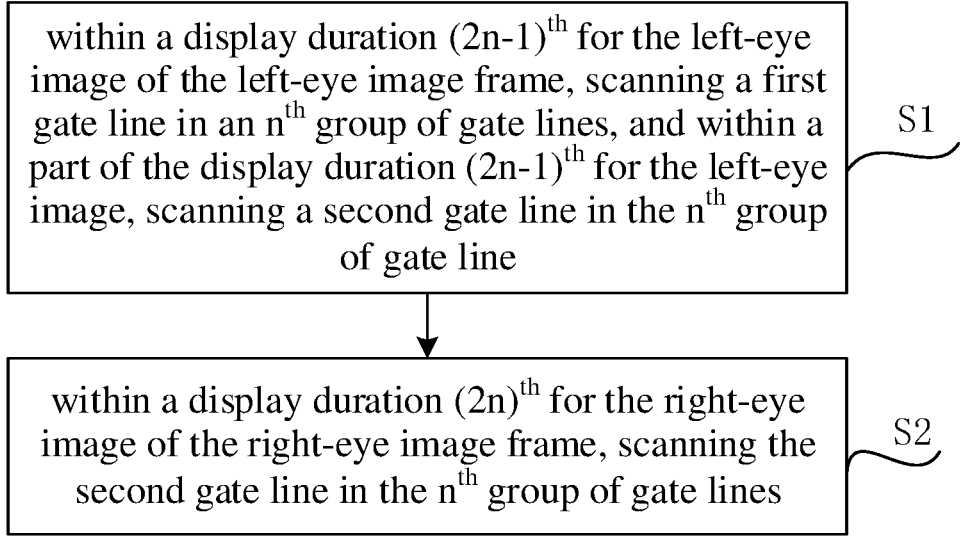
FIG. 1 is a flow chart of a 3D display driving method according to one embodiment of the present disclosure.

As shown in FIG. 1, the present disclosure provides a 3D display driving method for driving a display panel to display an image in a 3D manner. The display panel includes a plurality of gate lines which is arranged in rows and divided into M groups, and M is an integer greater than 1. Each group of gate lines includes two adjacent gate lines, and the two adjacent gate lines include a first gate line and a second gate line. Each display period includes a left-eye image frame and a right-eye image frame. Each left-eye image frame includes 2M display durations for a left-eye image, and each right-eye image frame includes 2M display durations for a right-eye image. The 3D display driving method includes, during each display period: Step S1 of, within a display duration $(2n-1)^{th}$ for a left-eye image of the left-eye image frame, scanning a first gate line in an $n^{th}$ group of gate lines, and within a part of the display duration $(2n-1)^{th}$ for the left-eye image, scanning a second gate line in the $n^{th}$ group of gate lines; and Step S2 of, within a display duration $(2n)^{th}$ for the right-eye image of the right-eye image frame, scanning the second gate line in the $n^{th}$ group of gate lines, n being a positive integer smaller than or equal to M.

According to the 3D display driving method in the embodiments of the present disclosure, each display period is divided into the left-eye image frame and the right-eye image frame, the plurality of gate lines arranged in rows is divided into M groups of gate lines, and each group includes two adjacent gate lines. Within a part of the display duration $(2n-1)^{th}$ for the left-eye image of the left-eye image frame, the second gate line in the $n^{th}$ group of gate lines is scanned. As compared with the related art where a double-frame frequency-multiplication scanning mode is adopted, in the embodiments of the present disclosure, a double-frame frequency-demultiplication hybrid gate scanning mode is adopted, so as to adjust a charging coefficient for the gate lines in some rows through adjusting a gate scanning time, thereby to ensure actual display data to be close to finally-written data. As a result, it is able to prevent the occurrence of 3D image distortion due to a great difference between an actual display brightness value and a written brightness value when a P-GDM display mode is adopted for displaying a 3D image in the related art.

During the implementation, a ratio of the part of the display duration $(2n-1)^{th}$ for the left-eye image to an entirety of the display duration $(2n-1)^{th}$ for the left-eye image is greater than 0 and smaller than 1. The value of this ratio is determined in accordance with actual data voltages applied to two adjacent rows of gate lines during the display.

Based on a hybrid gate signal driving mode in the embodiments of the present disclosure, through adjusting a pulse width of the gate scanning signal, it is able to ensure the actual display brightness value to be close to the written brightness value when the corresponding gate line is scanned repeatedly.

In actual use, each display period may include the left-eye image frame and the right-eye image frame arranged sequentially; or each display period may include the right-eye image frame and the left-eye image frame arranged sequentially.

In actual use, the first gate line may be a gate line in a first row of the group of gate lines, and the second gate line may be a gate line in a second row of the group of gate lines following the first gate line; or the second gate line may be a gate line in a first row of the group of gate lines, and the first gate line may be a gate line in a second row of the group of gate lines following the second gate line.

The 3D display driving method will be described hereinafter in more details in conjunction with the embodiments.

In one embodiments of the present disclosure, each display period is divided into a left-eye image frame and a right-eye image frame arranged sequentially. An $n^{th}$ group of gate lines include an $N^{th}$ gate line Gate_N and an $(N+1)^{th}$ gate line Gate_N+1 arranged in rows, and an $(n+1)^{th}$ group of gate lines include an $(N+2)^{th}$ gate line Gate_N+2 and an $(N+3)^{th}$ gate line Gate_N+3 arranged in rows, where n and N are each a positive integer.

Figure 2A:
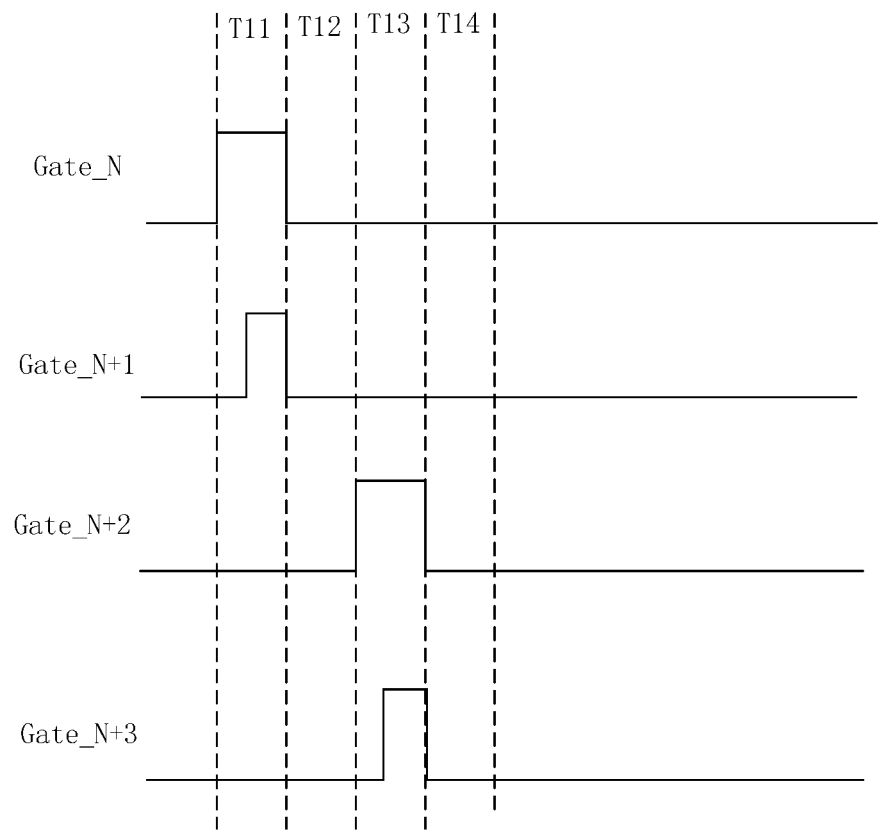
FIG. 2A is a schematic view showing gate driving signals for left-eye image frame adopted in the 3D display driving method according to one embodiment of the present disclosure.

As shown in FIG. 2A, a left-eye image frame includes a first display duration T11, a second display duration T12, a third display duration T13 and a fourth display duration T14.

Within the first display duration T11 of the left-eye image frame, the $N^{th}$ gate line Gate_N of the $n^{th}$ group of gate lines is scanned, and within a first scanning period of the first display duration T11, the (N+1)$^{th}$ gate line Gate_N+1 of the n$^{th}$ group of gate lines is scanned.

Within the third display duration T13 of the left-eye image frame, the (N+2)$^{th}$ gate line Gate_N+2 of the (n+1)$^{th}$ group of gate lines is scanned, and within a second scanning period of the second display duration T12 of the left-eye image frame, the (N+3)$^{th}$ gate line Gate_N+3 of the (n+1)$^{th}$ group of gate lines is scanned.

As shown in FIG. 2A, a ratio of the first scanning period to the first display duration T11 and a ratio of the second scanning period to the second display duration T12 are each a, i.e., a ratio of a gate turn-on time, and a is a positive number smaller than 1. At this time, a gate signal turn-on time is changed from T11 to α×T11 and changed from T12 to α×T12, so a brightness value or a grayscale value of an actually-displayed image may be smaller than a brightness value or a grayscale value corresponding to written data.

Figure 2B:
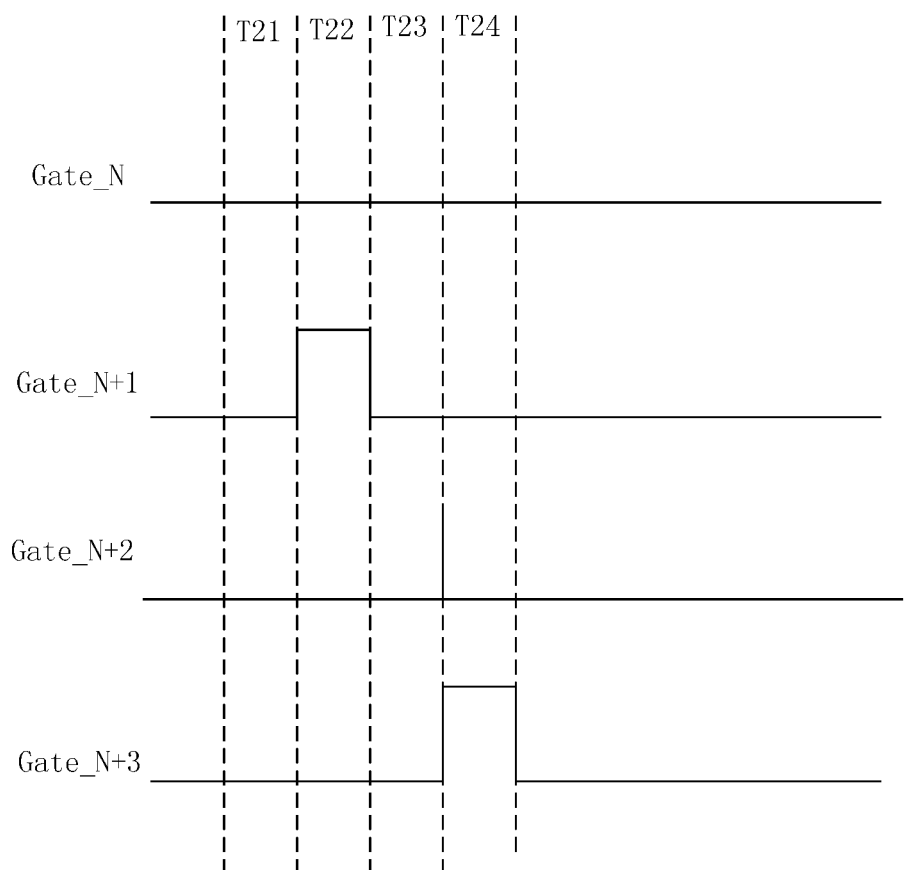
FIG. 2B is a schematic view showing gate driving signals for right-eye image frame adopted in the 3D display driving method according to one embodiment of the present disclosure.

As shown in FIG. 2B, a right-eye image frame includes a fifth display duration T21, a sixth display duration T22, a seventh display duration T23 and an eighth display duration T24.

Within the sixth display duration T22 of the right-eye image frame, the (N+1)$^{th}$ gate line Gate_N+1 in the n$^{th}$ group of gate lines is scanned. Within the eighth display duration T24 of the right-eye image frame, the (N+3)$^{th}$ gate line Gate_N+3 in the (n+1)$^{th}$ group of gate lines is scanned.

When a data voltage applied to a data line is A within the first display duration T11 of the left-eye image frame and the fifth display duration T21 of the right-eye image frame, the data voltage applied to the data line is B within the second display duration T12 of the left-eye image frame and the sixth display duration T22 of the right-eye image frame, the data voltage applied to the data line is C within the third display duration T13 of the left-eye image frame and the seventh display duration T23 of the right-eye image frame, and the data voltage applied to the data line is D within the fourth display duration T14 of the left-eye image frame and the eighth display duration T24 of the right-eye image frame. After displaying the left-eye image frame and the right-eye image frame, a data voltage applied to the N$^{th}$ gate line Gate_N may be A, a data voltage applied to the (N+1)$^{th}$ gate line Gate_N+1 may be avg(A×F+B), a data voltage applied to the (N+2)$^{th}$ gate line Gate_N+2 may be C, and a data voltage applied to the (N+3)$^{th}$ gate line Gate_N+3 may be avg(C×F+D). F is a brightness factor, and it represents a ratio of a period within which a brightness value acquired when the gate signal tune-on time is increased by a times is maintained to a period within which an initial brightness value is maintained, i.e., F is associated with a and has a value greater than or equal to 0 and smaller than or equal to 1. The avg(A×F+B) represents an average value of A×F+B, and the avg(C×F+D) represents an average value of C×F+D.

During the operation, an influence of the data voltage applied to the N$^{th}$ gate line on a display effect of the (N+1)$^{th}$ gate line may be adjusted through adjusting the value of F. The value of F may be acquired through experiments, i.e., calculating the data voltages applied to the adjacent gate lines.

In actual use, when the data voltage (data voltage A) applied to the N$^{th}$ gate line is close to the data voltage (data voltage B) applied to the (N+1)$^{th}$ gate line, F may have a value close to 1. At this time, the influence of the data voltage applied to the N$^{th}$ gate line on the display effect of the (N+1)$^{th}$ gate line is relatively small.

When there is a relatively large difference between the data voltage (i.e., the data voltage A) applied to the N$^{th}$ gate line is close to the data voltage applied to the (N+1)$^{th}$ gate line (i.e., the data voltage B) (e.g., when a text with a black-and-white background is being displayed), the display effect may be adversely affected by a data voltage Predata applied to the (N+1)$^{th}$ gate line within a previous frame. According to the 3D display driving method in the embodiments of the present disclosure, the (N+1)$^{th}$ gate line is charged for a relatively short period within T11 and T13, so when there is a large difference between the data voltages applied to the two adjacent gate lines, insufficient charging may occur, and thereby the display effect may be adversely affected by the data voltage applied to the (N+1)$^{th}$ gate line within the previous frame.

At this time, there are the following two circumstances.

When the data voltage A is capable of providing a large brightness value, the data voltage B is capable of providing a small brightness value and the data voltage Predata applied to the (N+1)$^{th}$ gate line within the previous frame is smaller than A, F may be smaller than 1, so that avg(A×F+B+Predata) is closer to B than avg(A+B). At this time, it is able to improve the accuracy of the display effects for the adjacent gate lines.

When the data voltage A is capable of providing a small brightness value, the data voltage B is capable of providing a large brightness value, and the data voltage Predata applied to the (N+1)$^{th}$ gate line within the previous frame is greater than A, F may be adjusted in such a manner to provide a small value for A×Factor and reserve display data within the previous frame to a great extent, so that the avg(A×F+B+Predata) is closer to a brightness of the data voltage B. At this time, Factor is close to 0. The avg(A×F+B+Predata) is an average value of A×F+B+Predata, and the avg(A+B) is an average value of A+B.

Usually, there is not a linear relationship between the data voltage and the brightness value in a realistic system, and A×F, B and Predata actually correspond to three data voltages. A purpose of the present disclosure is to acquire a brightness value close to that provided by the data voltage B, so the averaging operation mentioned above may be understood as acquiring an average value of the brightness values provided by different data voltages as a target brightness value.

Through analyzing and comparing the display data within consecutive frames using a chip, it is able to determine an appropriate value of F for displaying a current frame. Then, a charge rate for a certain part of the adjacent gate lines may be adjusted, so as to provide a display effect close to a normal display driving effect.

In the embodiments of the present disclosure, the order of the steps is not limited to the serial numbers thereof. For a person skilled in the art, any change in the order of the steps shall also fall within the scope of the present disclosure if without any creative effort.

Figure 3:
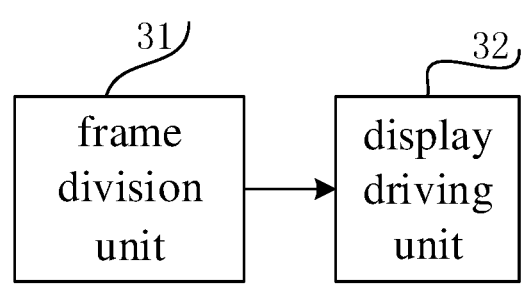
FIG. 3 is a block diagram of a 3D display driving device according to one embodiment of the present disclosure.

The present disclosure further provides in some embodiments a 3D display driving device for driving a display panel to display an image in a 3D manner. The display panel includes a plurality of gate lines which is divided into M groups, and M is an integer greater than 1. Each group of gate lines includes two adjacent gate lines. As shown in FIG. 3, the 3D display driving device includes: a frame division unit 31 configured to divide each display period into a left-eye image frame and a right-eye image frame; and a display driving unit 32 configured to, during each display period, within a display duration (2n−1)$^{th}$ for the left-eye image of the left-eye image frame, scan a first gate line in an n$^{th}$ group of gate lines, within a part of the display duration (2n−1)$^{th}$ for the left-eye image, scan a second gate line in the n$^{th}$ group of gate lines, and within a display duration (2n)$^{th}$ for the right-eye image of the right-eye image frame, scan the second gate line in the $n^{th}$ group of gate lines, where n is a positive integer smaller than or equal to M.

According to the 3D display driving device in the embodiments of the present disclosure, the frame division unit 31 divides each display period into the left-eye image frame and the right-eye image frame, and the display driving unit 32 scans the second gate line in the $n^{th}$ group of gate lines within a part of the display duration $(2n-1)^{th}$ for the left-eye image of the left-eye image frame. As compared with the related art where a double-frame frequency-multiplication scanning mode is adopted, in the embodiments of the present disclosure, a double-frame frequency-demultiplication hybrid gate scanning mode is adopted, so as to adjust a charging coefficient for the gate lines in some rows through adjusting a gate scanning time, thereby to ensure actual display data to be close to finally-written data. Through adjusting a charging coefficient for some gate lines, it is able to provide a better contrast as compared with the related art.

During the implementation, a ratio of the part of the display duration $(2n-1)^{th}$ for the left-eye image to an entirety of the display duration $(2n-1)^{th}$ for the left-eye image is greater than 0 and smaller than 1. The value of this ratio is determined in accordance with actual data voltages applied to two adjacent rows of gate lines during the display.

In actual use, each display period may include the left-eye image frame and the right-eye image frame arranged sequentially; or each display period may include the right-eye image frame and the left-eye image frame arranged sequentially.

In actual use, the first gate line may be a gate line in a first row of the group of gate lines, and the second gate line may be a gate line in a second row of the group of gate lines following the first gate line; or the second gate line may be a gate line in a first row of the group of gate lines, and the first gate line may be a gate line in a second row of the group of gate lines following the second gate line.

The units (including, but not limited to, the frame division unit 31 and the display driving unit 32) may be implemented by corresponding hardware circuits. The hardware circuit may include a conventional very-large-scale integration (VLSI) circuit, a gate array, a semiconductor such as a logic chip or a transistor, or any other discrete components in related art. The units may further be implemented by a programmable hardware device, such as a field-programmable gate array, a programmable array logic device and a programmable logic device.

The present disclosure further provides in some embodiments a display device including the above-mentioned 3D display driving device and a display panel. The display device may be any product or member having a display function, e.g., television, display, digital photo frame, mobile phone or flat-panel computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A three-dimensional (3D) display driving method for driving a display panel to display an image in a 3D manner, wherein the display panel comprises a data line and at least four gate lines, the at least four gate lines comprise a first gate line, a second gate line, a third gate line and a fourth gate line, and the first gate line, the second gate line, the third gate line and the fourth gate line are arranged in rows in that order and adjacent to each other, wherein:

each display period comprises a left-eye image frame and a right-eye image frame; and each left-eye image frame comprises at least four display durations for a left-eye image, the at least four display durations for the left-eye image comprise a first duration, a third duration, a fifth duration, and a seventh duration, each right-eye image frame comprises at least four display durations for a right-eye image, and the at least four display durations for the right-eye image comprise a second duration, a fourth duration, a sixth duration, and an eighth duration; and wherein the 3D display driving method comprises, during each display period:

within the first duration, scanning the first gate line, and within a part of the first duration, scanning the second gate line;

within the fourth duration, scanning the second gate line;

within the fifth duration, scanning the third gate line, and within a part of the fifth duration, scanning the fourth gate line; and within the eighth duration, scanning the fourth gate line, wherein after each display period, a data voltage applied to the first gate is A, a data voltage applied to the second gate line is equal to a result of a formula avg(A×F+B), a data voltage applied to the third gate line is C, and a data voltage applied to the fourth gate line is equal to a result of a formula avg(C×F+D), wherein A represents a data voltage applied to the data line within the first duration and the second duration, B represents a data voltage applied to the data line within the third duration and the fourth duration, C represents a data voltage applied to the data line within the fifth duration and the sixth duration, D represents a data voltage applied to the data line is within the seventh duration and the eight duration, and F represents a brightness factor that is greater than or equal to 0 and smaller than or equal to 1.

2. The 3D display driving method according to claim 1, wherein a first ratio of the part of the first duration for the left-eye image to an entirety of the first duration for the left-eye image is greater than 0 and smaller than 1, and a second ratio of the part of the fifth duration for the left-eye image to an entirety of the fifth duration for the left-eye image is greater than 0 and smaller than 1.

3. The 3D display driving method according to claim 2, wherein the first ratio is determined in accordance with a data voltage applied to the first gate line and a data voltage applied to the second gate line when the image is displayed by the display panel in the 3D manner, and the second ratio is determined in accordance with a data voltage applied to the third gate line and a data voltage applied to the fourth gate line when the image is displayed by the display panel in the 3D manner.

4. The 3D display driving method according to claim 2, wherein:

each display period comprises the left-eye image frame and the right-eye image frame arranged sequentially; or each display period comprises the right-eye image frame and the left-eye image frame arranged sequentially.

5. The 3D display driving method according to claim 1, wherein:

each display period comprises the left-eye image frame and the right-eye image frame arranged sequentially; or
each display period comprises the right-eye image frame and the left-eye image frame arranged sequentially.

6. A 3D display driving device for driving a display panel to display an image in a 3D manner, wherein the display panel comprises a data line and at least four gate lines, the at least four gate lines comprise a first gate line, a second gate line, a third gate line and a fourth gate line, the first gate line, the second gate line, the third gate line and the fourth gate line are arranged in rows in that order and adjacent to each other, wherein the 3D display driving device comprises:
a frame division unit configured to divide each display period into a left-eye image frame and a right-eye image frame, wherein each left-eye image frame comprises at least four display durations for a left-eye image, the at least four display durations for the left-eye image comprise a first duration, a third duration, a fifth duration, and a seventh duration, each right-eye image frame comprises at least four display durations for a right-eye image, and the at least four display durations for the right-eye image comprise a second duration, a fourth duration, a sixth duration, and an eighth duration; and a display driving unit configured to, during each display period:
within the first duration, scan the first gate line, and within a part of the first duration, scanning the second gate line;
within the fourth duration, scan the second gate line;
within the fifth duration, scan the third gate line, and within a part of the fifth duration, scan the fourth gate line; and
within the eighth duration, scan the fourth gate,
wherein after each display period, a data voltage applied to the first gate is A, a data voltage applied to the second gate line equals to a result of a formula avg(A×F+B), a data voltage applied to the third gate line is C, and a data voltage applied to the fourth gate line equals to a result of a formula avg(C×F+D), wherein A represents a data voltage applied to the data line within the first duration and the second duration, B represents a data voltage applied to the data line within the third duration and the fourth duration, C represents a data voltage applied to the data line within the fifth duration and the sixth duration, D represents a data voltage applied to the data line is within the seventh duration and the eight duration, and F represents a brightness factor that is greater than or equal to 0 and smaller than or equal to 1.

7. The 3D display driving device according to claim 6, wherein a first ratio of the part of the first duration for the left-eye image to an entirety of the first duration for the left-eye image is greater than 0 and smaller than 1, and a second ratio of the part of the fifth duration for the left-eye image to an entirety of the fifth duration for the left-eye image is greater than 0 and smaller than 1.

8. The 3D display driving device according to claim 7, wherein the first ratio is determined in accordance with a data voltage applied to the first gate line and a data voltage applied to the second gate line when the image is displayed by the display panel in the 3D manner, and the second ratio is determined in accordance with a data voltage applied to the third gate line and a data voltage applied to the fourth gate line when the image is displayed by the display panel in the 3D manner.

9. The 3D display driving device according to claim 7, wherein:
each display period comprises the left-eye image frame and the right-eye image frame arranged sequentially; or
each display period comprises the right-eye image frame and the left-eye image frame arranged sequentially.

10. The 3D display driving device according to claim 6, wherein:
each display period comprises the left-eye image frame and the right-eye image frame arranged sequentially; or
each display period comprises the right-eye image frame and the left-eye image frame arranged sequentially.

11. A display device, comprising the 3D display driving device according to claim 6.

12. The display device according to claim 11, wherein a first ratio of the part of the first duration for the left-eye image to an entirety of the first duration for the left-eye image is greater than 0 and smaller than 1, and a second ratio of the part of the fifth duration for the left-eye image to an entirety of the fifth duration for the left-eye image is greater than 0 and smaller than 1.

13. The display device according to claim 12, wherein the first ratio is determined in accordance with a data voltage applied to the first gate line and a data voltage applied to the second gate line when the image is displayed by the display panel in the 3D manner, and the second ratio is determined in accordance with a data voltage applied to the third gate line and a data voltage applied to the fourth gate line when the image is displayed by the display panel in the 3D manner.

14. The display device according to claim 12, wherein:
each display period comprises the left-eye image frame and the right-eye image frame arranged sequentially; or
each display period comprises the right-eye image frame and the left-eye image frame arranged sequentially.

15. The display device according to claim 11, wherein:
each display period comprises the left-eye image frame and the right-eye image frame arranged sequentially; or
each display period comprises the right-eye image frame and the left-eye image frame arranged sequentially.

* * * * *